US012489744B1

(12) United States Patent
Krew et al.

(10) Patent No.: US 12,489,744 B1
(45) Date of Patent: *Dec. 2, 2025

(54) MULTITIERED INTERFACING ARCHITECTURE

(71) Applicant: PROGRESSIVE CASUALTY INSURANCE COMPANY, Mayfield Village, OH (US)

(72) Inventors: David Mark Krew, Richfield, OH (US); John J. Zgonc, Aurora, OH (US); Matthew Todd White, Avon Lake, OH (US)

(73) Assignee: PROGRESSIVE CASUALTY INSURANCE COMPANY, Mayfield Village, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/223,292

(22) Filed: May 30, 2025

Related U.S. Application Data

(63) Continuation of application No. 19/064,157, filed on Feb. 26, 2025, which is a continuation-in-part of application No. 19/003,600, filed on Dec. 27, 2024, which is a continuation of application No. 18/216,333, filed on Jun. 29, 2023, now Pat. No. 12,192,191, which is a continuation of application No. 17/960,374, filed on Oct. 5, 2022, now Pat. No. 11,722,478.

(51) Int. Cl.
*H04L 9/40* (2022.01)
*G06Q 40/08* (2012.01)

(52) U.S. Cl.
CPC ......... *H04L 63/0823* (2013.01); *G06Q 40/08* (2013.01)

(58) Field of Classification Search
None
See application file for complete search history.

(56) References Cited

U.S. PATENT DOCUMENTS

2021/0058251 A1* 2/2021 Varadharajan ........ H04L 9/0643
2022/0198572 A1* 6/2022 Aggarwal .............. G06N 20/00

* cited by examiner

*Primary Examiner* — Brandon Hoffman
(74) *Attorney, Agent, or Firm* — Lempia Summerfield Katz LLC

(57) ABSTRACT

A system and method provide access to a remote resource locally by requesting content from an original address and receiving a first requested content and a first redirect uniform resource locator through an interactive element, such as a smart widget, for example. The first redirect uniform resource locator reroutes the navigation from the original address requested to a redirect destination address that serves an access token. The system and method unlock access to a second application programming interface in response to validating the access token served by the redirect destination address and receives a second requested content and a second redirect uniform resource locator in response to transmitting the access token to the original address. The second redirect uniform resource locator transfers an address different from the original address and the redirect destination address.

21 Claims, 11 Drawing Sheets

MULTITIERED INTERFACING ARCHITECTURE

PRIORITY CLAIM

This application is a continuation of U.S. application Ser. No. 19/064,157, which is continuation-in-part of U.S. application Ser. No. 19/003,600, which is a continuation of U.S. application Ser. No. 18/216,333, which is now U.S. Pat. No. 12,192,191 B1, which is a continuation of U.S. application Ser. No. 17/960,374, which is now U.S. Pat. No. 11,722,478 B1, all of which are incorporated herein by reference in their entireties.

BACKGROUND OF THE DISCLOSURE

Technical Field

This disclosure relates to a computer architecture, and specifically to a publicly accessible distributed network that interfaces remote computer resources.

Related Art

Limited access to useful, relevant, and appropriate hardware and/or software prevent some systems from communicating with other systems. In these systems, the lack of digitalization is a technological barrier to communicating with newer systems. Legacy systems, for example, often meet the needs for which they were programmed. They also generate data silos that prevent integration with newer, different, and/or more efficient computer systems.

Custom built turnkey web-based systems also present challenges. These specialized systems come with high monetary costs and longer establishment costs. Some systems cannot adapt to hardware and software changes without user intervention and often require knowledge of the end-to-end distributed systems to add and remove features.

Distributions systems are sensitive to the cost of interfacing custom built turnkey systems. Some custom built turnkey web-based systems are inefficient and require significant lead time to come online. These systems create turnpike effects that limit the distribution of services.

BRIEF DESCRIPTION OF THE DRAWINGS

The disclosure is better understood with reference to the following drawings and description. The elements in the figures are not necessarily to scale, emphasis instead being placed upon illustrating the principles of the disclosure. Moreover, in the figures, like referenced numerals designate corresponding parts throughout the different views.

DETAILED DESCRIPTION

An embeddable system and process (referred to as a system or systems) convert and bridge proprietary protocol from an originating source to a destination to provide access to remote resources. Some systems are stand-alone, some are integrated with other systems but independent of those systems, and others are a unitary part of an enterprise system. Generally, they are programmed to execute specific tasks repeatedly. For example, in an insurance application in which digital transactions are less common than those that typically occur in ecommerce, an exemplary embeddable system exchanges information relating to insurance quotes and/or insurance rates (e.g., and for purposes of this application, an insurance rate is an estimate of an insurance quote based on less than the full information needed to provide a bindable insurance quote) through a multi-tiered architecture. Other embeddable systems interact with other systems that provide other services including technical services, banking services and/or other financial services, brokerage services, vehicle sales/services, other insurance services (e.g., servicing existing insurance policies, servicing insurance claims, bundling insurance services, providing proof of insurance to users and/or third parties, such as car dealerships, etc. and other services that may provide co-branded offerings), real estate sales/services, and/or etc. Co-branding are products, services, or marketing campaigns jointly developed and promoted by two or more brands. The collaborations leverage the strengths, reputations, and market reach of each brand which often extend the market reach of the products and/or services. The embeddable systems integrate new functionality into websites seamlessly that usually do not serve such content without requiring the websites to write and support the code that renders it.

An exemplary embeddable system is a single or multiple microprocessor-based interface that performs specialized operations. For example, an insurance rate/quoting embeddable system provides insurance rates and/or insurance quotes, exclusively. The systems are tightly controlled and react to requests in real time (e.g., responding to systems at the same rate the receiving system receives information enabling the systems to direct or control a system and/or process) or near real time meaning without a measurable delay. Some real time systems execute operations at least as fast as the external system or the virtual process it is serving making it seem like the requesting node is executing a task locally. In some near real time systems, tasks are executed in less than about five seconds.

Figure 1:
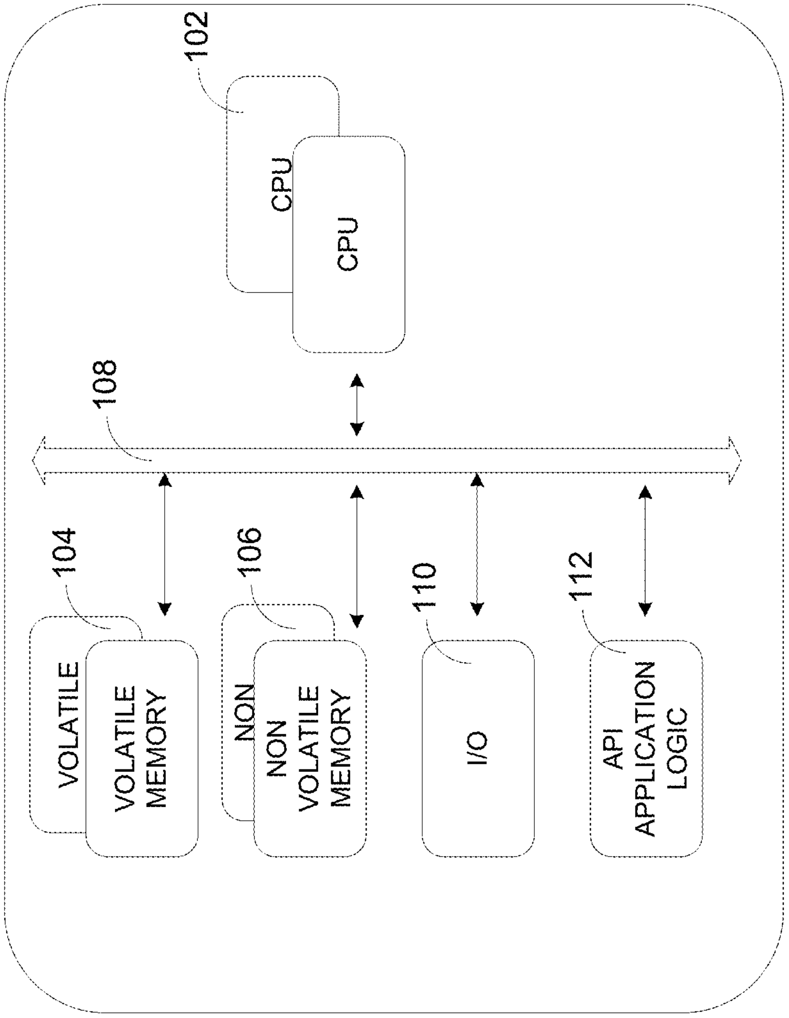
FIG. 1 is a flow diagram of an exemplary application programming interface.

The exemplary embeddable system of FIG. 1 includes memory coupled to one or multiple microprocessors 102 by a parallel circuit 108 or a local communication system such as a bus that transfers data between internal and external components. Some memory comprise a dynamic memory that improves microprocessor execution speed when the microprocessors 102 read and/or write to memory locations sequentially. In some systems, the dynamic memory is volatile and/or non-volatile memory 104 and 106, respectively. In other systems, the memory emulates a virtual disk drive that is read from and written to. The system's volatile memory 104 operates like a physical disk drive making the embeddable systems extremely fast without displacing the system's operating memory. Input and output interfaces 110 and local communication systems 108 connect peripherals and data pipelines to the embeddable system. The data pipelines ensure resource availability, manage inter-data dependencies, and minimize transient data delays that slows down executions. The data pipelines also allow embeddable systems to move and process data seamlessly that is usually locked up in local data silos.

In FIG. 1, the application programming interface logic 112 allows users to simplify and implement scalable integrations and workflows into the host systems and in some systems provide access to cloud-based systems and data. Some application programming interface logic 112 generates visual environments that model and automate processes visually through a series of steps known collectively as a workflow. In these systems, the application programming interface logic 112 interfaces a cloud-based platform that creates and manages those automated workflows that have access to just-in-time data without delays.

Figure 2:
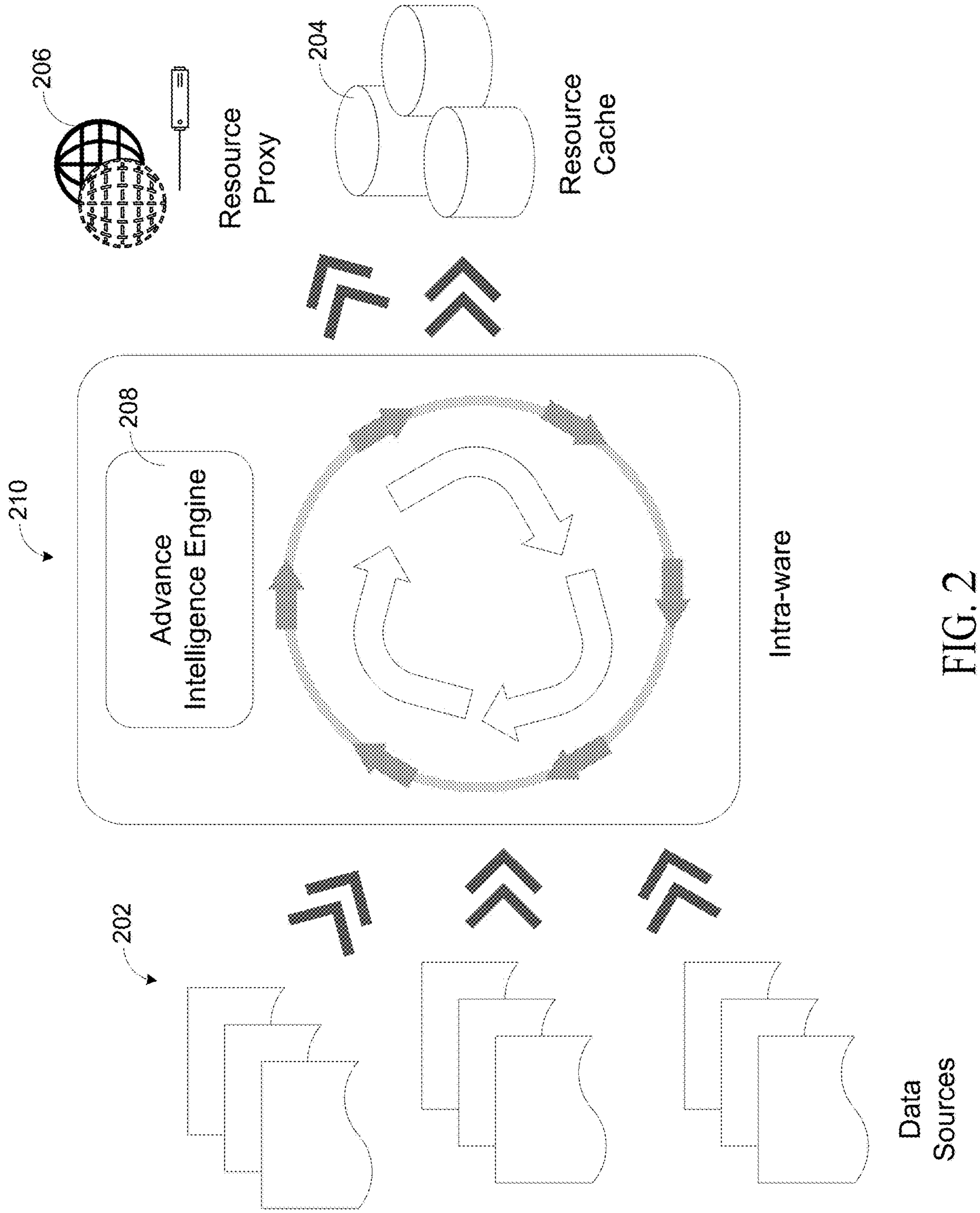
FIG. 2 is a flow diagram of a process harvesting and redirecting content.

Some systems provide remote content locally. The systems harvest multiple remote sites 202 through an intra-ware application 210. The intra-ware application 210 downloads content, intercepts links, and transparently maps those links to local uniform resource locators that serve the same content locally as shown in FIG. 2. The redirect uniform resource locators (e.g., the local uniform resource locators) point to local addresses and define the protocol that accesses them. Some addresses specify the new source and destination. In some systems, the harvested content reside in a local resource cache 204, in others the harvested content is accessible to a local resource proxy 208. In some systems, remote resources are retrieved before they are needed. By intercepting and redirecting the link and/or generating new local uniform resource locator links, the resource server 308 serves content from local trusted sources, which minimize the delays and latencies that come with waiting for remote requests to be filled, some of which may be filled by unverified sources in an unsecure or secure environment. The disclosed processes also reduce the load on the remote resource sites and the communication networks that serve them.

Drawing upon a plurality of profiles stored in a parallel database 812, some embeddable systems deliver content to customized user profiles in use by identifying unique combinations of characteristics that differentiate users from one another through an advanced intelligence engine 208 (also referred to as an intelligent engine) resident to the intra-ware application 210; and in alternate systems, through comparisons to profile classifications retained in the parallel database system 812. By combining received data with contextual information about the user, such as, for example, the user's location (e.g., device proximity via global positioning) and address, a classification is executed by the intra-ware application 210 that classifies the user based on comparisons of characteristics. Intra-ware 210 comprises one or more software applications that sit between or interface two or more types of software; and in some applications, translates information between them. In some systems, it sits between a server's operating system and a network's operating system.

In an insurance context, the comparison characteristics used to train the advanced intelligence engine 208, and/or used by alternate systems, comprise risk characteristics that include one or more measurable or observable factors or characteristic that are predictive of future insurance claims or losses. A future insurance loss (also referred to as the risk of loss) may be estimated by the product of the probability of an occurrence of an insured claim times the likely cost of the claim and an insurance rate. Because the probability of an insurance claim occurring is a different value than the probability of an auto accident occurring, auto insurance rates are typically calculated based on the likelihood of claim occurrence, not the likelihood of an accident.

An actuarial class for a particular risk characteristic that in part determines insurance quotes, and in some instances insurance rates, has a risk factor associated with the risk characteristic. A risk factor is a numerical value for that actuarial class that is used to calculate an expected loss estimate for a prospective insured. The numerical estimate is a ratio of an expected loss of one actuarial class to another. An actuarial class also has a rating factor associated with it. A rating factor is a numerical value for the actuarial class that is used to calculate the requested insurance rate and/or insurance quote for a prospective insured. It relates to the difference in rates or quotes offered to users. The rating factor reflects not only the differences in the expected losses (i.e., the risk factor), but also the differences in expected expenses and the other components of the insurance rate.

In an exemplary embedded system, an insurance rate and/or insurance quote reflects more than the degree of risk being transferred to the insurer. In addition to provisions made for expected future claim costs and claim settlement expenses, an insurance quote (and in some instances, some insurance rates) also includes adjustments for expected operational and administrative expenses, and the insurer's cost of capital. The difference between any two insurance rates and/or insurance quotes, respectively, will not be identical to the difference in the degree of risk being transferred because the insurance quote and some insurance rates must also include provisions for operating expenses and profit. To ensure the insurance rate and/or insurance quote follow statutory rate standards, an insurance rate and/or insurance quote is also adjusted (increased/decreased) based on the geographic state rules under which the insurance coverage is provided, the past and prospective loss experience of the insurer, the experience of other insurance rate filers, business judgment, and factors in which the insurance rate and/or insurance quote is rendered.

Some embeddable systems include a tiered embedded application programming interface architecture that orchestrates exchanges. A first tier application programming interface interacts with a communication network, like a private network, or a publicly accessible distributed network, like the Internet. When the first tier application programming interface retrieves resources from a remote server it is a remote application programming interface. When communicating through the Internet, the first tier application programming interface may adhere to web standards and use Hypertext Transfer Protocol (HTTP) for request messages and provide a definition of the structure of response messages. These response messages may take the form of an Extensible Markup Language (XML) and/or JavaScript Object Notation (JSON) file.

The application programming interfaces 304 and 306 comply with six standards. The application programming interfaces 304 and 306 serve a client-server architecture and are cacheable, eliminating the need for some client-server interactions. The application programming interfaces 304 and 306 mediate a layered system (e.g., some layers include additional features like load balancing, shared caches, and/or security), and allow the resource server 308 to extend functionality to the requesting server by transferring executable code and resources. The executable code and resources are identified in requests that are separate from the representations returned to the clients. The application programming interfaces 304 and 306 enable clients to receive files that represent resources. These representations have sufficient information to allow for the modification and/or deletion of those resources. Further, each response returned to a client contains sufficient information to describe how the client should process and/or render the information, making them self-descriptive objects. After accessing a resource, the requesting entity is able to discover, through hyperlinks in some applications, the actions required to execute one or more transactions. In response to the first tier application programming interface request, the interface also receives a redirect uniform resource locator.

Execution of the redirect uniform resource locator results in a request being made for an access token from the resource server 308, its designated proxy 206, or an authorization/authentication service or server 312. In some applications, the access token comprises a sixteen-byte code that identifies the interface node to an object across all of the systems and networks serving a session or executing the transaction and/or series of tasks. In other applications the access token is greater than sixteen bytes and in some alternate systems includes a tracking-code. In some applications, the token is unique because it includes a time stamp and a program code based on the network address requesting the content served. In these applications, a secure and accurate system clock mediates attacks, such as replay-attacks. In a replay attack, an intervenor records prior messages and uses them later in an attempt to subvert an intended exchange. A session comprises a time-delimited period in which one or more client/server requests and response occur to complete a task. In communication, it is the time in which the sending system (e.g., the server) and the receiving system (e.g., the client) maintain a persistent communication connection.

In response to the request for an access token and after checking/validating the request's authorization code, parameters, and the requesting source's credentials, the resource server 308, authentication server 312, or a token authority or service generates an access token that includes an expiration date (and an optional refresh token) and a cache control. Some validations ensure that the authorization code is valid, and has not expired. The validations verify that the authorization code was issued to the requestor by an authorized issuing authority. Some validations ensure that redirect uniform resource identifier parameters match the redirect uniform resource identifier that was used to request the authorization code. An exemplary redirect uniform resource identifier parameter comprises a character string that identifies a resource by a type-classification and its location (e.g., such as by its virtual address).

If the authorization code for the access token is used more than once, the resource server 308 or authorization service denies subsequent requests. This occurs because the authorization code is retained in a cache or a longer-term memory for the lifetime of the authorization code. When verifying authorization codes, the resource server or authorization service first checks if the authorization code was already used by comparing the transmitted code to the cache of previously stored authorization codes. Once the authorization code reaches its expiration date, it is deleted from the cache, making it no longer available for validation. The authorization service or resource server 308 further rejects validation codes that reach an expiration date through the validation code's cache header's expiration date, further securing the system through multiple tiers of security.

Besides granting an authorization code that renders access tokens that typically last anywhere from several minutes to several hours (e.g., eight hours), a response to the first tier application programming interface request often returns content. The validation of the token unlocks a second tier application programming interface.

In an exemplary insurance rate/insurance quoting application, the returned content may include a textual geographic state-specific insurance disclosure and/or regulatory disclosures that must be displayed and acknowledged or simply acknowledged before the host 302 grants access to the second tier application programming interface. In some applications, the second tier application programing interface harvests data from the host 302 that is then transmitted with the validated access token. When the access token is re-validated at the resource server 308, the resource server 308 processes the received content, selects data stored in the local resource cache 204 and/or select data accessible to local resource proxy 206. In some systems, that data includes data indexed by the intra-ware application 210.

In return, the remote resource server 308 returns an insurance rate. The insurance rate includes a second redirect uniform resource link that specifies a protocol used to access a resource, the server where the resource resides, an address to that resource, and, optionally, the path to that resource (e.g., the route through the structured collection that defines the exact location). In the exemplary insurance rate/insurance quoting application, the second redirect uniform resource link transfers the user to a remote site that presents a user with a bindable insurance quote in the same computing session. In some exemplary insurance rate/insurance quoting applications, the remote resource server 308 serves insurance rates, insurance quotes including bindable insurance quotes for different users (e.g., different drivers, different insureds) and/or different products (e.g., coverages for different vehicles)—from one driver and one vehicle to two or more drivers and/or two or more vehicles, for example. Some exemplary insurance rate/insurance quoting applications serve insurance products covering many insurable scenarios including shared products (e.g., shared vehicles), short-term rentals, ridesharing, gig economy contracts, and/or multi-user scenarios (e.g., multi-driver scenarios, multi-owner scenarios, multi-property scenarios), etc. Further, each of the described insurance applications may also provide physical and/or virtual proof of insurance to users and/or third parties (e.g., third party sellers, service providers, object owners, etc.) when insureds accept rates and/or quotes and/or receive insurance.

In some systems, proof of insurance occurs when a user's information is confirmed through a privacy-focused exchange between one or both application programming interfaces 304 and 306 and the remote resource server 308 and/or its local or remote proxy 206. For example, the system may authenticate the user making the request for proof of insurance using the access token-based authentication process described herein, that may further include a layered or multi-factor authentication (e.g., confirmation via biometric data, an authentication app, etc.) to enhance security. The second application programming interface 306 sends the request for such proof on behalf of the user over a secure version of Hypertext Transfer Protocol such as a Hypertext Transfer Protocol Secure, for example. Once the access token is validated and the identity evidence is authenticated, the remote resource server 308 and/or proxy 206 returns a minimal data set to the user and/or third party, such as a response with fields including information as to if/when the insurance policy is active [start date] and corresponding object(s) (e.g., vehicle(s)/residence(s) identification(s)). In some systems, the fields may include optional information such as the termination [end date] of the insurance coverage and other data that may comprise a proof of insurance document. A proof of insurance document may include policyholder information, beneficiary information, coverage information (e.g., such as details about coverages, liability limits, etc.), object information (e.g., identify the make, model, year, etc., of the object such as a vehicle and/or home, for example), effective dates, and/or insurance company information or combination of this information. In some systems, the confirming information provided to the user and/or third party is based on the user's requests or his/her elections. Depending on the application, a user facing interface of the insured and/or third party such as a computer mediated technology 310, for example, in communication with the second application programming 306 may receive a detailed proof of insurance document or simply receive a response such as a "yes" or "no" reflecting the existence of the object's coverage (e.g., vehicle(s) and/or home(s) coverage) without revealing more information depending on the insured's election and/or insurance system. The exemplary exchange is structured and privacy focused so that the insurance application provides a reliable, secure, and authenticated insurance confirmation with the desired level of detail requested by the user and/or authorized by the user and/or required by the third party.

In some systems, the access token is a self-encoded structured data object that does not require database lookups for validation service; and in some systems it includes tracking code making the embedded system scalable. In some systems, verifying the access token occurs through a library. The library stores a public key infrastructure or PKI key (also referred to as a public key). In an exemplary use case, a public key corresponds to the private infrastructure key that signs and encrypts the exemplary access tokens. The public key unlocks the content of the access token, revealing all the information required to authenticate the requestor (e.g., user identification, scope of the transaction, etc.); and in some alternate systems, provides tracking, such as inter-device tracking. In some sessions, the inter-device tracking enables a transaction to be executed across multiple client devices.

Figure 3:
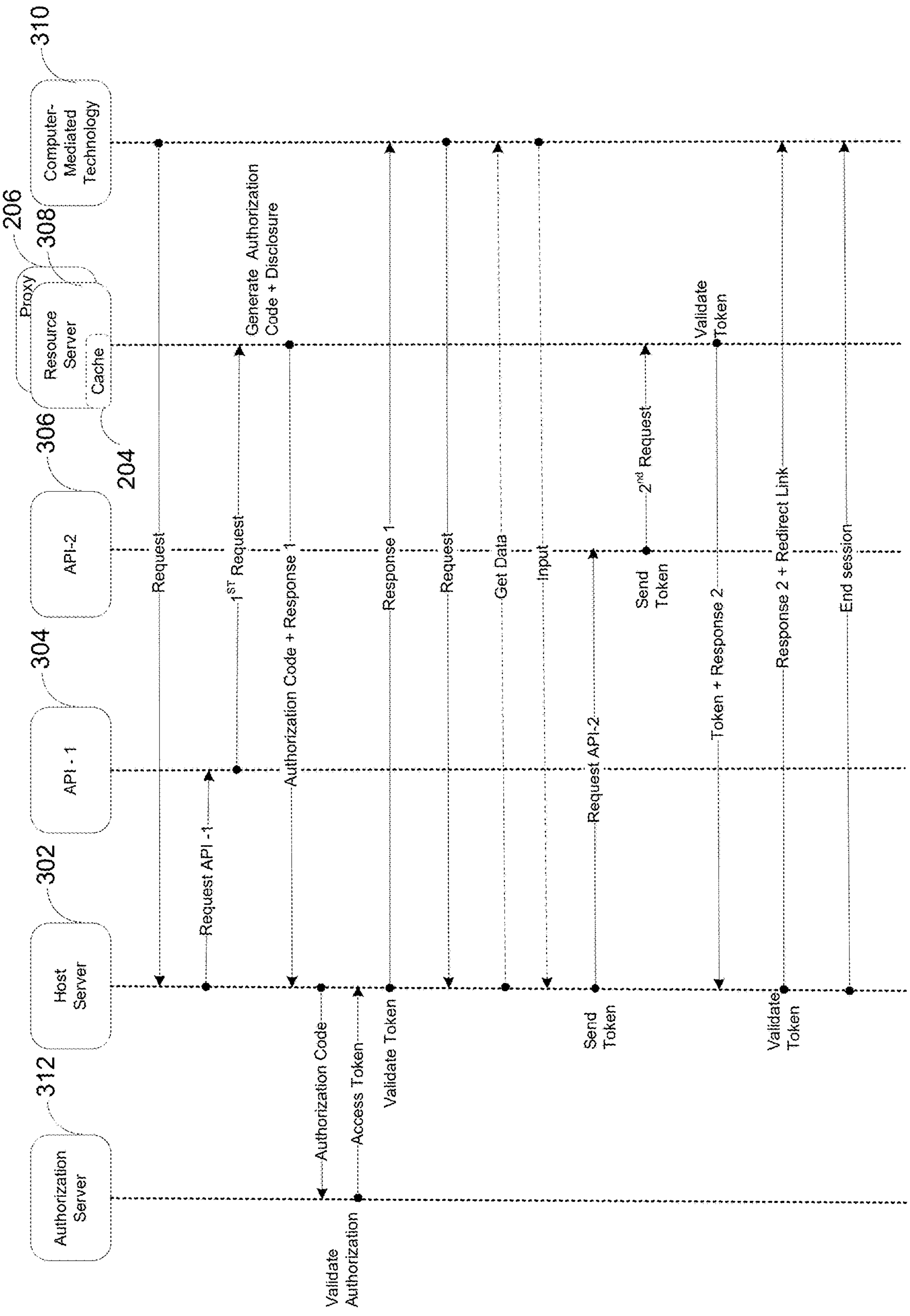
FIG. 3 is a flow diagram of an embeddable system interfacing computer technology.

FIG. 3 is a flow diagram of a multiple tiered application programming interface communicating with a resource server 308. In FIG. 3, a host server 302 interfaces tiered application programming interfaces 304 and 306, the resource server 308, and a computer-mediated device 310. The computer-mediated device 310 interface can interface other user devices, including those that render social media. Social media generally refers to computer-mediated technology that enables users to request information, create and share content, participate in networking, and/or participate in virtual communities. Computer-mediated technology 310 enables human communication that occurs through two or more electronic devices. The devices may provide input from various sources including, but not limited to, audio, text, images, video, etc. Some social media interfaces users through mobile applications, which are computer programs designed to run on mobile devices, such as wireless phones, watches, and/or portable tablets.

In FIG. 3 the resource server 308 is the transactional entity, separate from, but in communication with, the host server 302. In an insurance context, a computer-mediated technology 310 may request an insurance rate and/or quote, or service for an insurance claim or service for an insurance policy or financial service and/or product. Its associated information provides context to data, often in a hierarchical order. A higher-level sub-context may identify one or more financial products, such as insurance products, for example, such as automobile insurance, motorcycle insurance, condominium insurance, recreational vehicle insurance, renter insurance, etc., and a lower-level sub-entity may provide the information needed to complete a transaction associated with an insurance rate or quote, such as the desired coverage limits for an insurance rate and/or quote.

In FIG. 3, the application programming interfaces use access tokens to control access to the resource server 308. The access token, which is a nonreducible encrypted textual element in some systems, determines which systems and/or components are given access to local application programming interfaces and content at the remote resource server 308 at the level for which they are approved. Among other processes, the resource server 308 processes received and harvested data to generate a response.

While one resource server cluster is shown in FIG. 3, multiple resource server clusters 308 (and their authorized proxies) and/or resource engines are used in other systems (individually and collectively represented by reference number 308) that handle the same or different transactions. The resource server 308 may host a resource engine that serves an insurance rating and/or quoting system, the same or another resource engine may serve an insurance claims processing system, the same or another resource engine may serve an on-line insurance servicing system of existing insurance policies, and the same or another resource engine may serve a bundling of insurance policies, for example.

In this disclosure, any resource server 308 or engine in the systems described may manage services, or delegate management with other servers and/or engines, making the embeddable systems scalable and secure. If an embeddable system is hosted in an environment that becomes infected by a virus or malware, for example, a delegated management allows the embeddable systems to maintain the state and flow of a transaction by transferring the transaction to an uninfected server and/or engine before the server and/or engine is isolated. The input and output controls and strategic management controls of the transaction can be shared and executed by servers and/or engines and/or passed to a single server and/or engine.

Data flow is managed through an I/O manager. The I/O manager may be standalone, may be integrated with, or may be a unitary part of, the host server 302, and/or distributed between the tiered application programing interfaces 304 and 306 through delegations. Some I/O managers process exchanges without maintaining state variables, such as objects that track the transaction history. A stateful system tracks the details of a transaction between the server and the client.

In FIG. 3, a session begins when a request is transmitted to the host server 302. The host server 302 initiates sessions, confirms session terminations, and in some instances, maintains sessions. The host server 302 responds to the request by calling the first tier application programming interface 304 that transmits the request to the resource server 308 in the resource server's native protocol, like a gateway. In reply, the resource server 308 transmits a first response with a resource and a first redirect uniform resource locator. The first redirect uniform resource locator reroutes the navigation from an original uniform resource locator address to another to move the request from the original destination to another without requiring a separate request for the new address. The first redirect uniform resource locator includes an original server field that holds the original address that was requested, a redirect address field that serves a destination address to an access token, and/or a redirect type field establishing the permanence of the redirection to the redirect address. The redirection may be a temporary redirection that coincides with a time period established in the token cache header or it can be a permanent redirection.

The access token includes a client identifier, a grant type designation based on client credentials (e.g., username, password, etc.), stateful or statefulness (e.g., such as designating the access token stateless or stateful), and in some alternate systems, establishing a grant type (e.g., establishing the level of access) and/or including a tracking code. In FIG. 3, the access token is issued by an authorization server 312 remote from the resource server 308. In other systems, the authorization server 312 is part of the resource server 308. The host server 302 delivers the response to the user's computer-mediated technology 310 through a bridge, and receives a user's request in return. If user data residing in the host server 302 is not sufficient to respond to the user's request, the host server 302 requests additional user data though the computer-mediated technology 310, as shown by the optional exchange (shown by the dashed flow lines) in FIG. 3.

Validation of the access token at the host server 302 unlocks the second tier application programming interface 306. The second tier application programing interface 306 harvests data resident to the hosting server 302 and/or receives additional information from the user and transmits that data with the access token to the resource server 308. When the access token is validated, the resource server 308 processes the transmitted data with its local data. The local data is stored in the resource server's cache 204 and/or is accessible to its proxy 206 that is indexed by the intra-ware application 210. In return, the resource server 308 returns information to the host server 302. In some systems, the information includes a second redirect uniform resource locator (also referred to as a second redirect link and second redirect uniform resource link) that specifies the protocol used to access an object that makes the resource bindable. The second redirect uniform resource locator reroutes the navigation from an original uniform resource locator address to another address redirecting the request from the original destination. The second redirect uniform resource locator also includes an original server field that holds the original address that was requested (different from the original address), an address field that serves more resources (the destination field), and/or a redirect type field establishing whether the redirection is a temporary redirection or a permanent redirection. In some systems the second redirect link comprises a redirect uniform resource link that automatically transfers the user from the host server's environment to another environment remote from the host server's environment, where the additional resources reside.

In alternate systems, the redirect uniform resource link returned in the second response frames more remote resources through the host server 302, allowing the user to view content served by the host server 302 framed around information sourced by another server, such as the resource server 308 displayed on the user's computer-mediated technology 310. In other systems, the second redirect uniform resource link generates in-line content that displays or renders a file served by the host server 302 that is also served and rendered through a second server, such as the resource server 308, for example. In-lining occurs when the user served by the host server 302 can, without leaving that first website, views a display that is also displayed on a second website.

Figure 4:
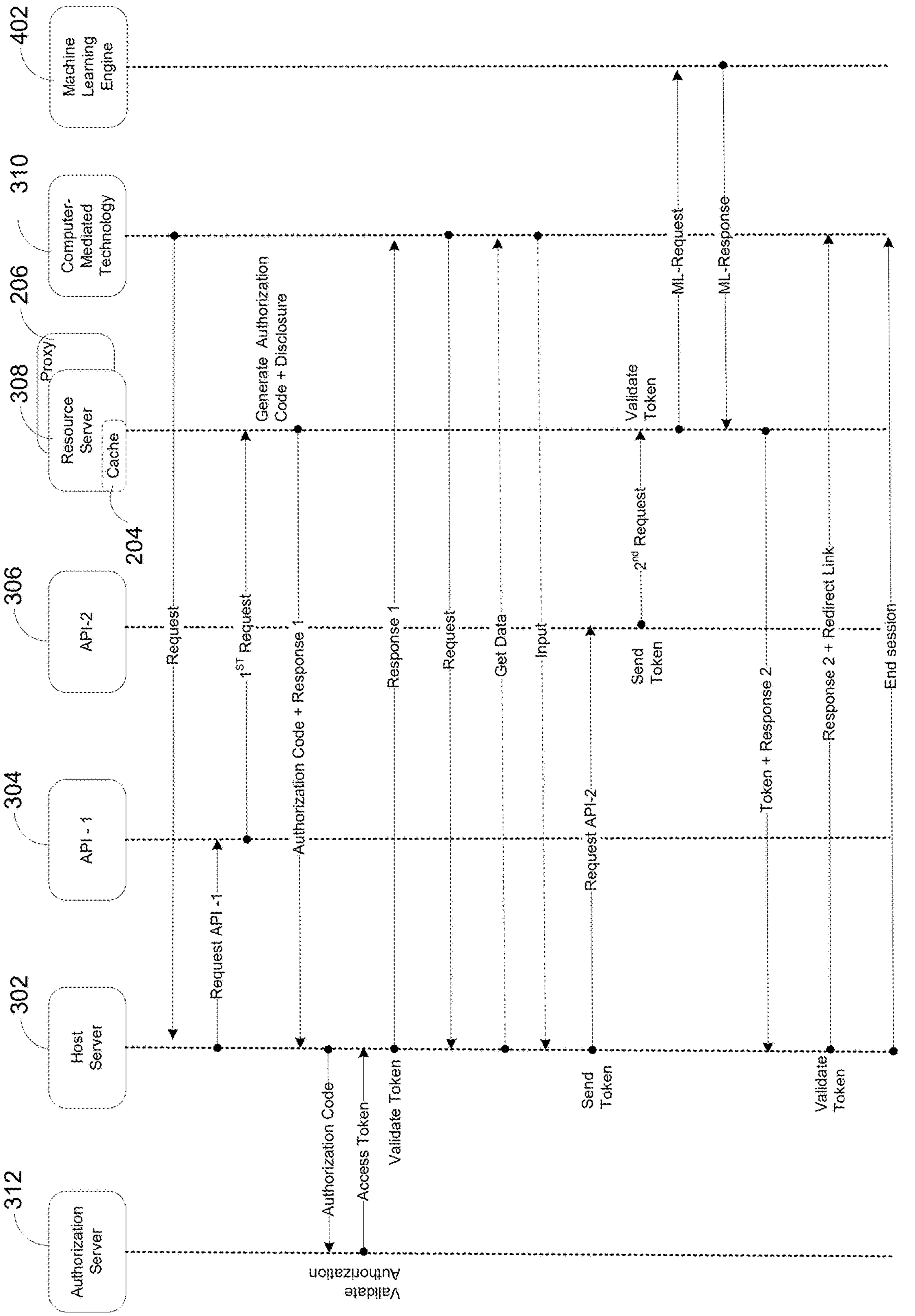
FIG. 4 is a second flow diagram of an embeddable system interfacing computer technology.

In FIG. 4, the second response returned by the resource server 308 is generated entirely, or in part, by one or more machine learning engines 402 (referred to as the machine learning engine) that, in some systems is a stand-alone system and in other systems comprises part of the advanced intelligence engine 208. The machine learning engine 402 processes the data transmitted by the second tier application programming interface 306. In the system of FIG. 4, data stored in the resource server's cache 204 and/or accessible to its delegated proxy harvested and/or was indexed by the intra-ware application 210 is processed by the machine learning engine to generate the machine learning response (ML-Response). In this system, one or more machine learning algorithms detect, analyze, classify, and generate responses that automatically interact with the system; and in some instances, train the machine learning engine 402 to emulate such intelligence. An exemplary machine learning training algorithm trains the machine learning engine to generate responses, such as providing insurance ratings, insurance rates, insurance quotes, insurance claim services, insurance policy services, insurance bundle services, and other services and/or tasks such as other financial services and/or tasks. Based on repeated training of prior user characteristics, the machine learning algorithms train the machine learning engines.

Rather than relying on a single type of machine learning engine to generate responses, other embeddable systems also generate requests using a second (different) type of machine learning algorithm (different from the first machine learning engine) operating concurrently in a parallel configuration to improve the accuracy and speed of the system's responses. In the system, a second machine learning engine also processes the data transmitted by the second tier application programming interface 306 with select data stored in the resource server's cache and/or resource server proxy.

In operation, the data transmitted by the second tier application programming interface 306 and select data stored in the resource server's cache 204 and/or proxy 206 are processed by the various types of machine learning engines and the response associated with the highest confidence score being selected by a standalone mediating processor or the resource server 308. In alternate systems, a boosting configuration is used in which machine learning engines are serially configured (e.g., the output of the first machine learning engine becomes input of the second machine learning algorithm generating a second modified machine learning output that becomes the input of a third machine learning algorithm generating a third output that becomes . . . ) to reduce residual error. The number of machine learning engines (e.g., stages) varies with the required accuracy of the embeddable systems.

When multiple machine learning engines are used, the machine learning algorithms may include supervised learning models, unsupervised learning models, and/or combinations that operate independently in stages and jointly as a unitary machine learning engine. Some integrations such as serial integrations, for example, are based on minimizing a measured machine learning engine residual, $MLE_{RES}$, which is the difference between a response (e.g., the predicted response of the machine learning engine) and the correct response. In the serial configuration, a second machine learning engine, $MLE_2$, is generated to fit or minimize the residual of the prior machine learning engine, $MLE_1$. The first and the second machine learning engines are combined (e.g., $MLE_1+MLE_2$) such that the input of the second machine learning engine, $MLE_{2input}$, comprises the output of the first machine learning engine $MLE_{1out}$, rendering a boosted version of the first machine learning engine $MLE_1$. The boost generates a lower residual error than a single machine learning engine, $MLE_1$ or $MLE_2$. The residuals of the serially combined machine learning engines are lower than the sum of the residuals of the machine learning engines (e.g., equation 1); and in some systems, less than the residual of the individual machine learning engines alone (e.g., equation 2).

$$\Sigma MLE_{RES(n)}(x)>MLE_{RES(x-1)}(x)+MLE_{RES(x)}(x)+\ldots \quad (1)$$

$$MLE_{RES(n)}(x)>MLE_{RES(x-1)}(x)+MLE_{RES(x)}(x)+\ldots \quad (2)$$

In use, the number of machine learning engine stages comprising the machine learning engine 402 depends on the required residual (e.g., $MLE_{RES}\leq MLE_{PRE\ RES}$). In these applications, stages are serially staged until the measured $MLE_{RES}$ is at or below the required residual error. As such, two, three, four, five or more machine learning engine stages operate like a unitary machine learning engine, and in some systems are referred to as the machine learning engine 402.

The first, the second, the third, etc., machine learning engines alone, in a parallel configuration, or in a serial configuration (e.g., $MLE_1+MLE_2+MLE_3 \ldots MLE_n$) may be rule-based, may be modeled based, or may be a hybrid combination of one or more rule-based systems and one or more model-based systems, for example, depending on the application. In an exemplary rule based system, the rule comprises intelligent rules such as static rules created by domain experts that rely on encoded knowledge. For example, in an insurance context, exemplary intelligent rules may tailor insurance rates and/or bindable insurance quotes to user attributes and profiles to enhance personalization and provide a more accurate product and/or service in comparison to generic offers such as rate proposals and/or insurable quotes. The intelligent rules may be based on known patterns and criteria. For example, when a user under twenty-five years of age seeks insurance on a high risk sedan, for example, an exemplary intelligent rule may be applied that is expressed as the following exemplary statement.

IF vehicle_type="sports car" or "sedan" AND user_age<25 THEN select high risk table.

A logical engine then evaluates the rules against the input data to generate responses. In this exemplary system, the intelligent rules are updated in memory 804 as new patterns are established or are detected rendering new and/or modified responses.

The model based machine learning engines include models that are trained on data to identify patterns, make predictions, and/or take actions. The model based machine learning engines learn by processing labeled training data (supervised learning). The machine learning engines, which may comprise neural networks, decision trees, regression models, etc. in rule based applications or model based applications, process the labeled training data to optimize parameters, which minimize a loss function that is part of the machine learning training algorithm. The loss function may reflect a mean squared error (when a mean is used) or mean absolute error (when a median is used), for example. In some systems, a desired error rate is attained by recursively splitting the training data in a way that maximizes a desired criterion and/or until a training iteration limit is met. The time needed to train a model based machine learning engine is proportional to the number of splits that are evaluated during training. In some systems, the model based learning engines handle large complex data sets allowing the model based learning engines to learn and improve their accuracy over time. The systems scale to different computational architectures.

In some exemplary systems, a combination of rule-based machine learning engines and model based machine learning engines leverage learning, provide flexibility, and are scalable to financial and/or insurance based environments. An exemplary architecture uses rule-based machine learning engines to enforce process requirements, product requirements, regulatory rules and/or geographic requirements and uses the model based machine learning engines to generate predictions and/or respond to input and/or requests that are not served by the intelligent rules applied by the rule-based machine learning engines.

Figure 5:
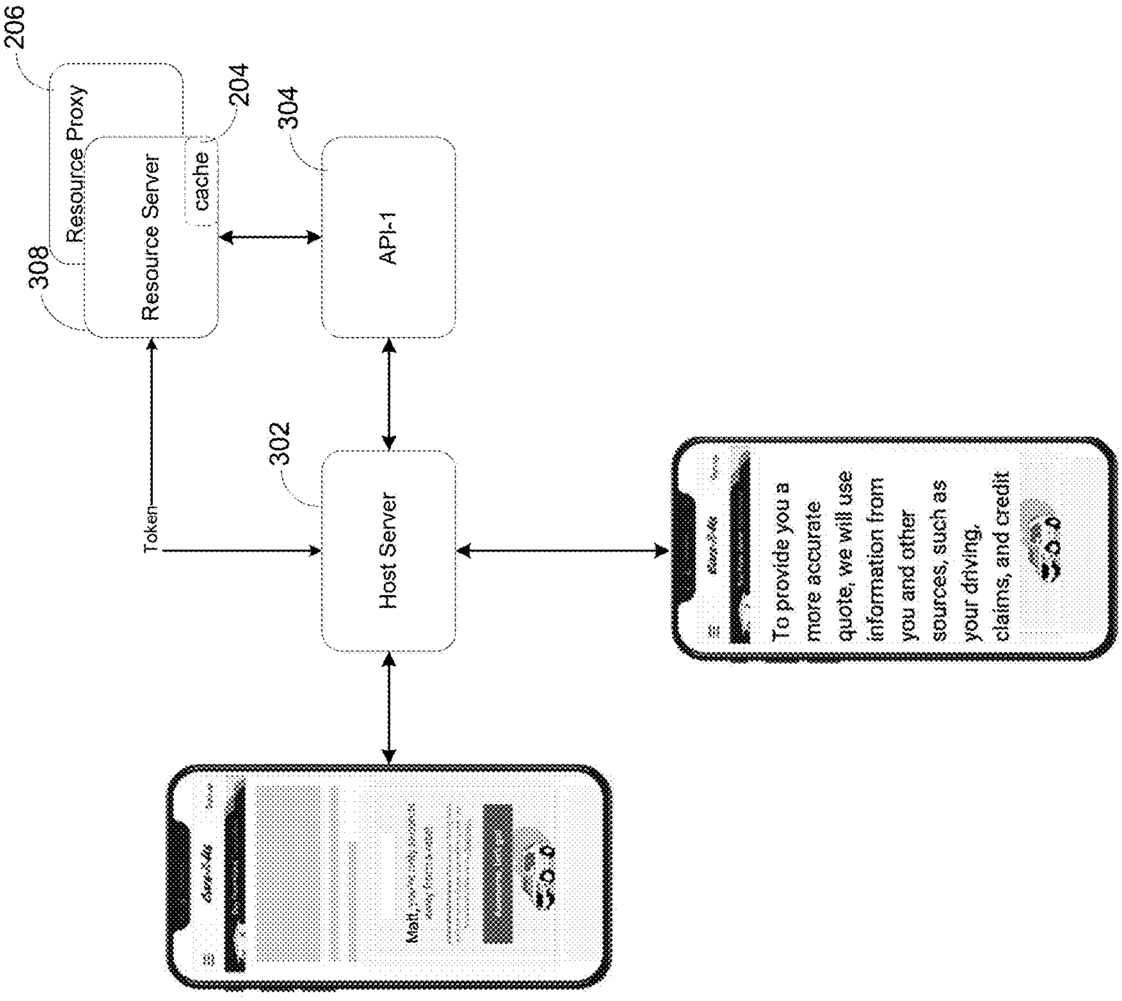
FIG. 5 shows a multi-tiered embeddable system interfacing a wireless device.
Figure 6:
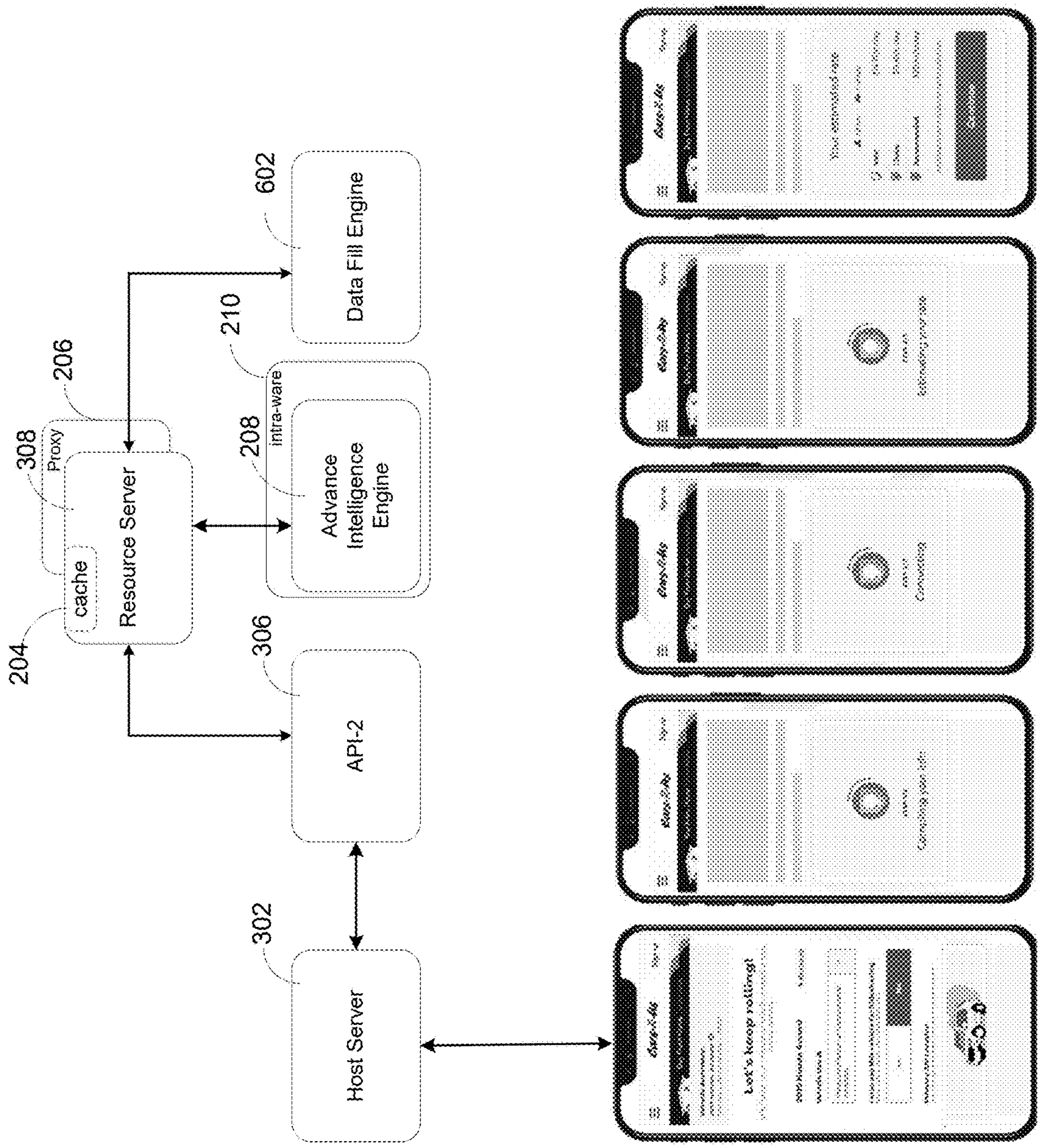
FIG. 6 further shows a multi-tiered embeddable system interfacing a wireless device.

In use, FIGS. 5 and 6 show a wireless device interfacing an embeddable system in an insurance rating and/or quoting system. A session begins when the wireless device (e.g., a computer-mediated technology) transmits a request to the host server 302. The host server 302 initiates the session and responds to the request by calling the first tier application programming interface 304 that transmits the request to the resource server 308. The request is transmitted in the resource server's native protocol like a gateway. In reply, the resource server 308 transmits state specific disclosures that must be acknowledged (along with validation of the globally unique identifier described below) to receive access to the second tier application interface and eventually an insurance rate and/or quote. The reply includes a first redirect uniform resource locator that can obtain a 128-bit self-validating globally unique identifier that is used across all of the computers and networks wherever a unique identifier is required. In FIGS. 5 and 6 the globally unique identifier is issued by the resource server 308. The host 302 delivers the state specific disclosure to the user's wireless device through a bridge and receives a user's request in return.

Validation of the globally unique identifier at the host server 302 unlocks the second tier application programming interface 306 and causes the host server 302 to transmit the user's data such as the user's address, date of birth, vehicle identification number, for example, and the globally unique identifier to the resource server 308.

When the globally unique identifier is validated, the resource server 308 processes the transmitted data with its local data. The local data is stored in the resource server's 204 cache and/or is accessible through its proxy 206 that was previously indexed by the intra-ware application 210. Local data may include address data, driver data, and/or vehicle data sourced by the data fill engine 604. The address data may include the driver's mailing address, city, state, and/or zip code. The driver data can include first name, last name, date of birth, gender, marital status, homeownership status, education, and/or employment/occupation. The vehicle data may comprise a full or a partial vehicle identification number that identifies the vehicle's make, model, year, and body style, ownership/leasing status, expected use, and/or where the vehicle is garaged.

Some systems harvest additional information from motor vehicle reports and a loss underwriting exchange. An exemplary loss underwriting exchange comprises an exchange that provides insurance claim history that tracks the prior seven years of a driver's personal auto insurance claims. In response, the resource server 308 returns one or more estimated insurance rates and a redirect uniform resource link to the wireless device via the host server 302. The redirect uniform resource link generates in-line content that displays or renders a file served by the host server 302 that is also served, interlined, and/or rendered through a second server, such as the resource server 308, for example. In other systems, the redirect uniform resource link transfers the wireless device from the host server 302 to an external and/or remote server that renders a bindable insurance quote when activated. In these systems, the redirect uniform resource link provides direct access to another remote server environment (e.g., served by the resource server 308 or its delegate proxy 206) remote from the host server 302. When the bindable insurance quote is accepted at a remote site, some alternate embeddable systems return a confirmation to the host server 302, and some transmit some or all of the details of the transaction to the host server 302.

In FIG. 6, the advanced intelligence engine 208 generates three estimated insurance rates based on a plurality of assumptions and defaults related to a plurality of insurance rating factors described above. In some systems, the assumptions and defaults are dynamically established by one or more machine learning engines 402, in other systems they are determined from profile classifications, in other systems they are based on statistical analytical defaults and/or on static and/or dynamic empiric and/or heuristic data comparisons, in other systems they are established by classifications with static values based on historical data, and in other systems they are based on combinations of these processes such as artificial intelligence and/or other factors. In some systems, the advanced intelligence engine 208 resides within an orchestration platform that leverages one or more predictive algorithms, including supervised learning models, unsupervised learning models, and/or combinations by processing data, provided, at least in part, by the host server 302, to render predictive insurance rates.

Because some users move between multiple devices (e.g., between cell phones, tablets, laptops, etc.) some alternate systems further track inter-device use and provide seamless transfers between those devices during the session when authenticated, while maintaining token level transaction security. Based on a plurality of device profiles stored in a device identification database 814, some alternate systems deliver content to the device in use (the active device) by identifying unique combinations of characteristics that identify active devices, users, and differentiate between devices based on user and device profile comparisons. By combining device data with user information, a predictive identification is executed by alternate intra-ware applications 210 that identify the user, and in some systems, each of the user's active authorized devices. The system tracks users across multiple devices (device tracking), which provide seamless and continuous consistent transaction presentations through the host server 302. When a user and/or the user's active device is identified, the content delivered by the embedded system is customized to the form factor and function of that device that the user is using. The intra-ware application 210 customizes the functionality that the embeddable system provides to the identified device's capabilities. In some systems, a historical tracking supplements or is used in place of the predictive tracking. The historical tracking process relies on user established and/or entered data retained in the device identification database 814 to identify users and the users' devices. The historical data may be provided directly to the systems by users or accessed/collected from data collection exchanges.

An exemplary device identification begins with a request to access the host server 302. The host server 302 responds by delivering a tracking code in each response to the device that in some alternate systems is part of the access token. The tracking code collects device characteristics that contain details about the device such as the device's form factor (e.g., size, shape, and style, layout, and position of its components, etc.), native application version accessing the host server 302, the device's screen resolution, operating system, applications, activation status, and a user identifier. The tracing code is encrypted and transmitted to the host server 302 when the device requests resources and processed against the profiles stored in the device identification database 812 to identify the active device and optionally the user through comparisons to existing devices stored in the profiles automatically. When a match occurs, the device and user's association is authenticated, and the transaction (e.g., the insurance quote) continues when the globally unique identifier and/or access token is authenticated, even when a user switches between authorized devices during a session. The cross-device tracking allows the host server 302 to seamlessly deliver and serve content in a session to the active authorized device. If the device is not identified and authorized, a predictive tracking and/or historical process may be executed through the device and the user and device identifier and corresponding device characteristics (described above) are stored in a new profile stored in in the device identification database 814.

Figure 7:
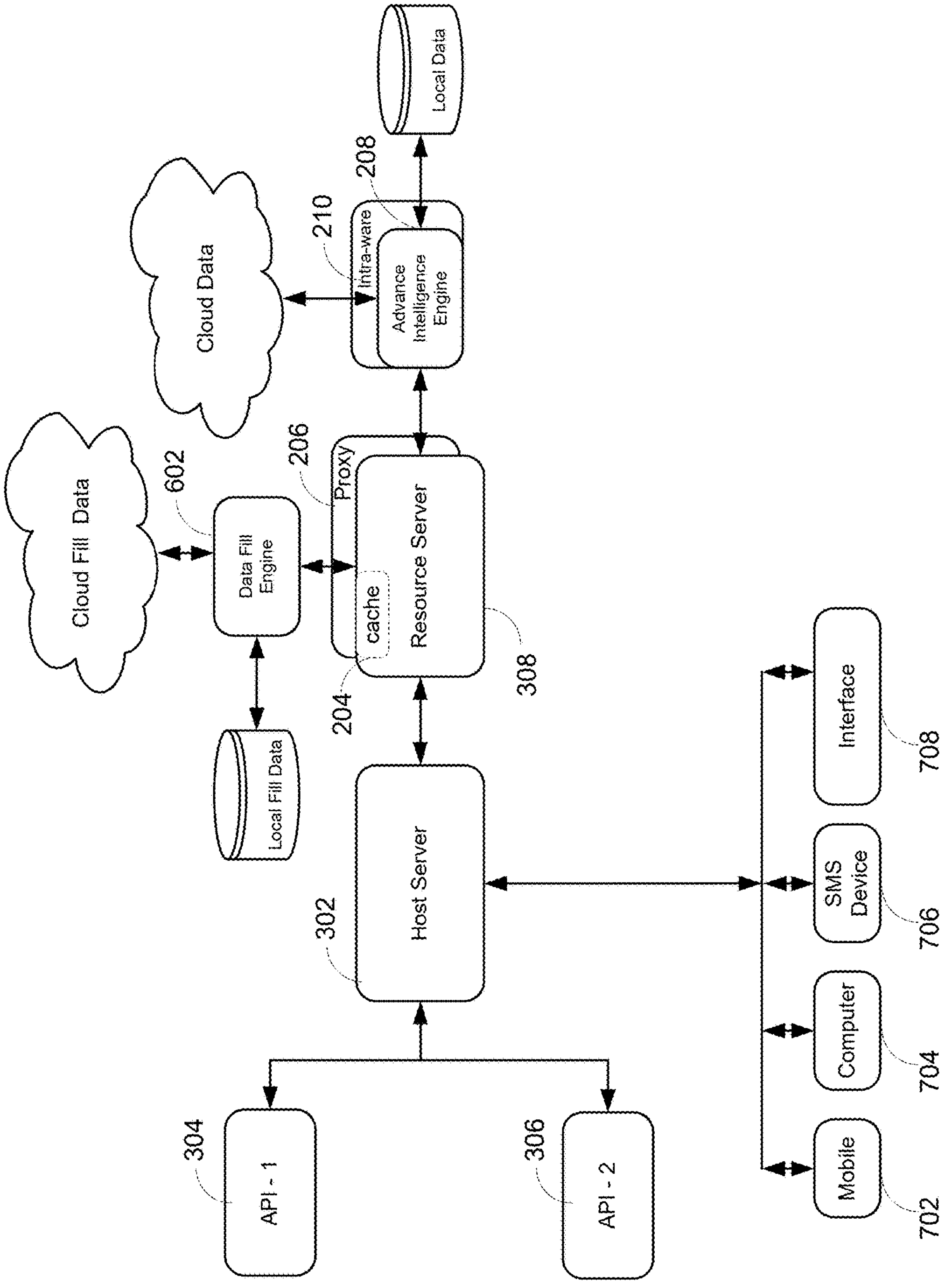
FIG. 7 is a block diagram of an exemplary architecture of an embeddable system.

FIG. 7 is an exemplary architecture of an embeddable system that executes the process flows and/or performs the functions provided by the systems described herein and shown in FIGS. 1-6 and 8-11 and in some alternate systems, are rendered within a unitary system and/or integrated system, that operate via distributed components that reside within a local system or a local environment. In FIG. 7, the host server 302 interfaces tiered application programming interfaces 304 and 306, the resource server 308, and computer-mediated devices 702-706 and interface 708. The interface 708 communicates with other users or remote devices, including those that exchange audio, text, images, video, etc. The advanced intelligence engine 208 is integrated with the intra-ware application 210 that interfaces the resource server 308. The advanced intelligence engine 208 and intra-ware application 210 access cloud based and locally stored resources. Local data and cloud based data are accessible to the data fill engine 602 that reduces the amount of manual entry required in the transactions. The data-fill engine 602 reduces the effort needed to complete the transactions, resulting in faster completions, greater accuracy, and reduced abandonment. Ultimately, the data-fill engine 602 reduces friction from the transaction process which improves online conversion rates.

Figure 9:
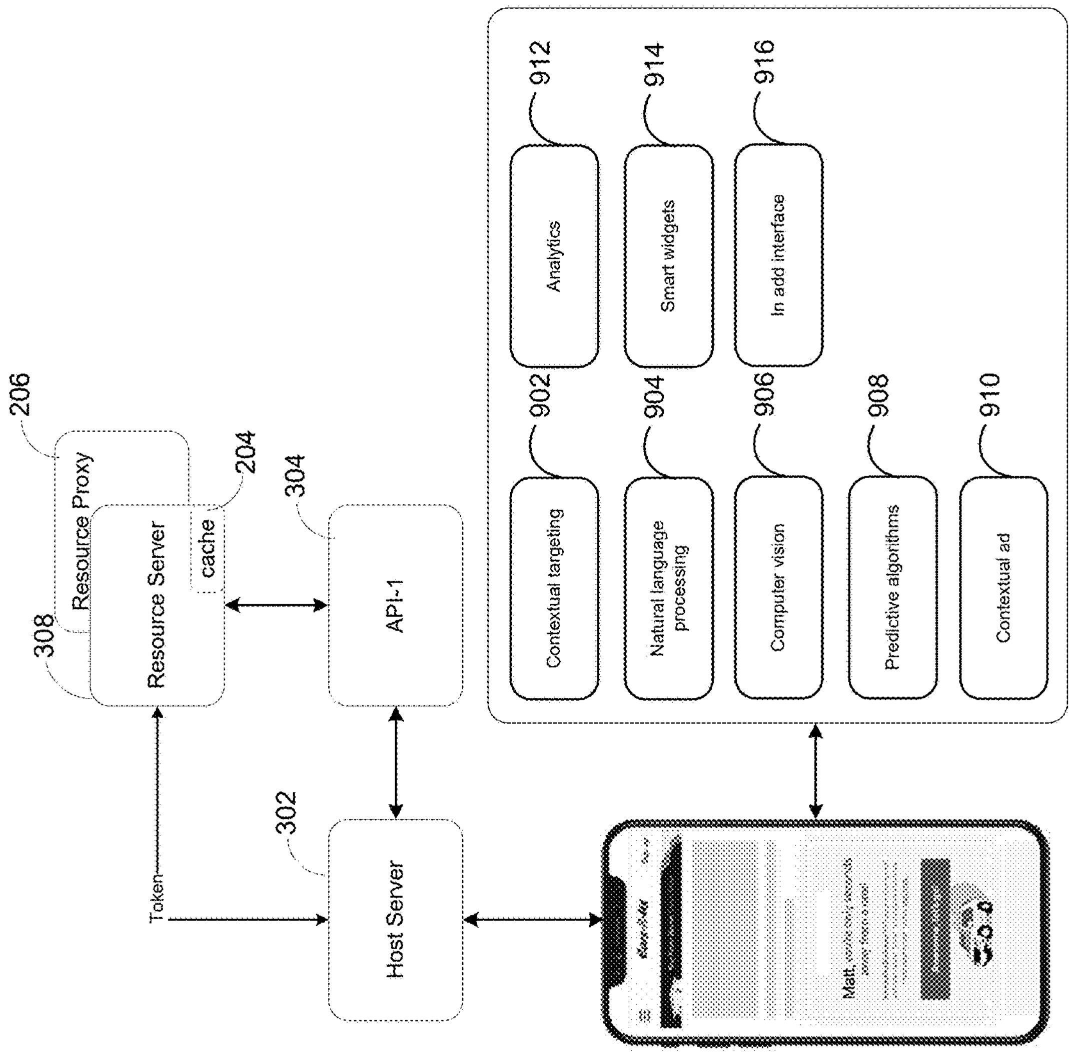
FIG. 9 shows another multi-tiered embeddable system interfacing a wireless device.
Figure 10:
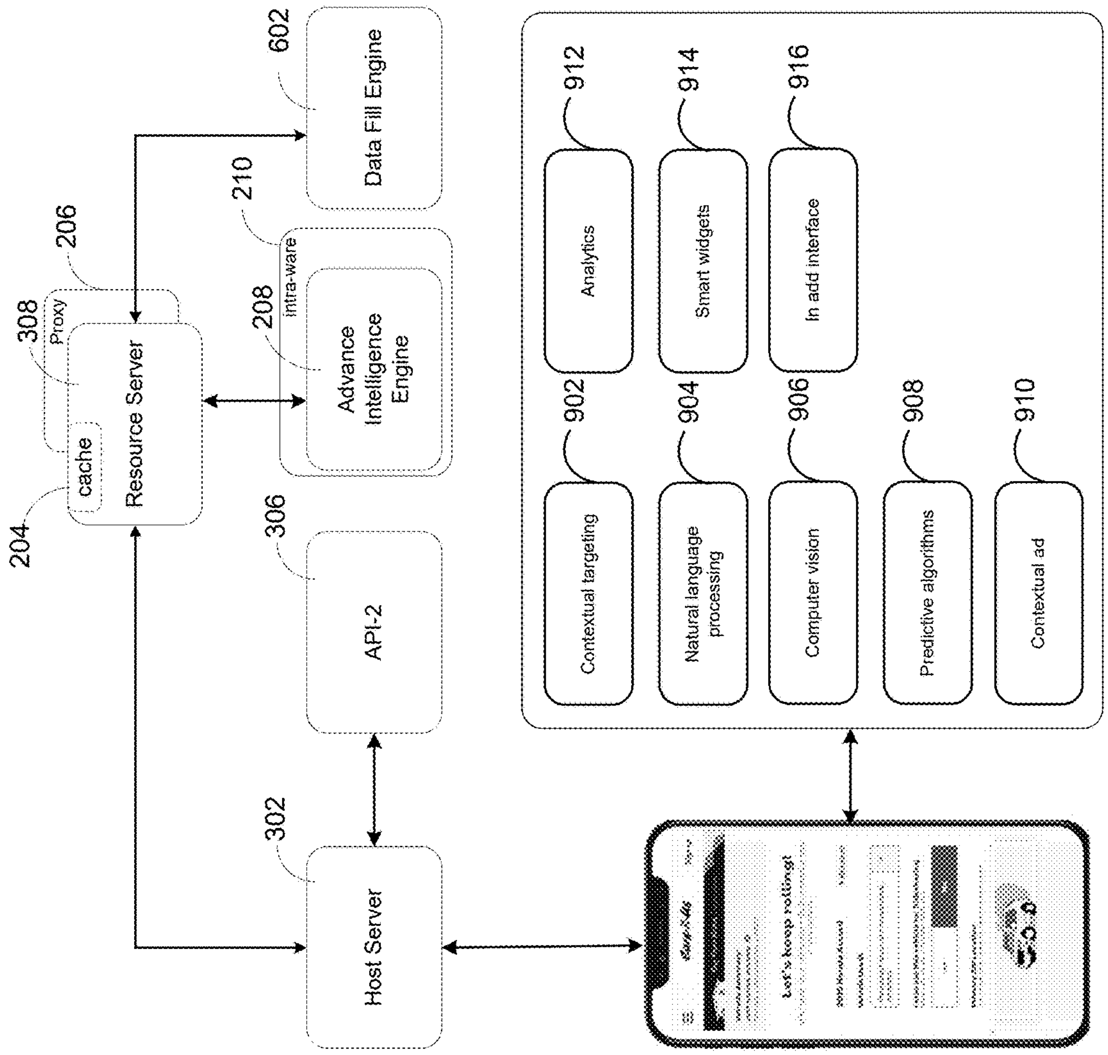
FIG. 10 further shows the multi-tiered embeddable system of FIG. 9 interfacing a wireless device.

FIGS. 9 and 10 show another wireless device interfacing the embeddable system that may serve products and/or services (e.g., such as financial product and/or services, insurance products and/or services, etc.). A session begins when the wireless device (e.g., a computer-mediated technology 310) transmits a request to the host server 302. The host server 302 responds to the request by calling the first tier application programming interface 304 that transmits the request to the resource server 308. The request is transmitted in the resource server's native protocol like a gateway. In reply, the resource server 308 transmits content, which may include contextual ads, smart widgets, and/or in-add browsing, etc. In some systems, the contextual ads, smart widgets, and/or in-add browsing, provide different types of ads in one or more on-line sessions.

Contextual adds comprise content that is dynamically adapted to the content displayed on and/or stored in the computer-mediated technology 310, which in FIG. 9 is a wireless device. A contextual targeting algorithm 902 analyzes content rendered on the computer-mediated technology 310 or within its cache to identify keywords, themes, sentiment, etc., and/or combinations. Some contextual targeting algorithms 902, such as the model based machine learning engines or rule-based machine learning engines described herein. The contextual targeting algorithms 902 leverage natural language processing engines 904 and/or computer vision engines 906 to scan and analyze text and images received by and/or stored on the computer-mediated technology 310. In some systems, the content is categorized into predefined verticals and/or assigned dynamic categories that are stored in memory. Using predictive algorithms 908 that may include logistic regression, gradient boosting machines, collaborative filtering, neural networks, multi-armed bandits, etc. and/or a combination, for example, a contextual add engine 902 matches the analyzed content with an inventory of ads stored in the memory of the wireless device or requested and/or received from a destination, such as the host server 308, for example. A logistic regression comprises a statistical process that predicts the probability of a user's interest based on features such as user behavior data, demographic data, and/or requested content attributes. Unlike linear regression which predicts continuous outcomes, the logistic regression in this application predicts the probability of a user's engagement and/or interest in a product and/or service and/or advertisement. For example, when a user requests information on certain vehicle types, an exemplary logistic regression assigns a higher probability to vehicle-related insurance products and serves vehicle-related insurance ads, for example. Based on metrics such as the click-through-rates, conversion rates, time spent engaging with the ad, and/or other metrics and combinations measured by the analytics engines 912 that may track code embedded in the ad (e.g., java script) or interactions with the ad, some contextual add engines 910 update the preferred rendering of ads to improve ad selection and rendering through an iterative selection across one or multiple user sessions. Further, when an add is selected, and in some applications optional disclosures acknowledged (along with validation of the globally unique identifier and/or access-token described herein) the user receive access to the second tier application interface shown in FIG. 10 through the processes and systems disclosed herein that provides access to the advertised product and/or service and/or product or service of interest.

Smart widgets 914 comprise customizable code that resides and/or is received by the computer-mediated technology 310. Unlike conventional widgets, smart widgets 914 (also referred to as multitiered smart widgets and interactive widgets) allow users to access products and services, such as financial related products and/or services, insurance related products and/or services, for example, using the embeddable systems and processes that provide access to resources. Some interactive functionality served by the smart widgets 914 in an insurance domain provide users with rates and bindable quotes, provide access to risk assessment tools (e.g., view driving habits, home security functions, provide suggestions for lowering insurance premiums, and/or etc.), provide users with claim filing functionality and/or assistance (e.g., guide user through the steps of filing a claim, uploading one or more pictures, and/or etc.) and/or provide policy management tools (e.g., functionality that allow users to view policy details, make payments, update information, and/or access digital identification cards with the smart widgets 914) in applications, such as insurance applications, for example.

Some smart widgets 914 analyze user behavior data, demographic data, and user preference data through the natural language processing engines 904 and/or the computer vision engines 906 that scan and analyze text and images received by and/or stored on the computer-mediated technology 310 to render a dynamic personalization. Using generative models, decision trees, etc., and/or combinations, the smart widgets 914 generate unique content. Some exemplary generative models are transformer-based architectures that include generative pre-trained transformers and optional bidirectional encoder representations for transformers that process input, such as text input through natural language processing 904 and/or neural networks. In an exemplary transformer architecture, an attention mechanism weights an input sequence to understand the context of the input. Optional bidirectional encoder representations for transformers capture the context of the input; and the generative pre-trained transformers process the input sequentially to generate an output that responds to the input communicated through the application programming interfaces via the embeddable systems and processes described above and herein and further shown in FIGS. 9 and 10. The exemplary smart widget generative models generate human-like responses (e.g., responses that are generally grammatically correct, syntactically coherent, and mimic human conversational patterns) and accurately respond to requests. In some applications, the smart widgets 914 render natural and conversational language (e.g., avoiding formal or robotic phrasing) that follow the rules of natural language flow as humans use in conversations. The smart widget's 914 human-like responses may show empathy and understanding by for example, acknowledging the user's input and responding to the user's input directly, personalizing responses, by for example, providing personalized information, and by asking specific questions relevant to the user's issue such as through chatbots, and by providing clear guidance that may anticipate user inputs via predictive analytics 908 that auto-suggest. In some systems, the natural language processing 904 that analyzes the input to the smart widgets 914 also generates personalized responses with the generative pre-trained transformers. Personalized responses are also generated through the computer vision 906 by incorporating visual elements in those responses. In these exemplary systems, reinforcement learning of the generative models boost and adjust output to build up user engagements.

The in-ad browsing enables users to interact with remote and local sites directly through the application programming interfaces and processes via the computer-mediated technology 310. Using a simplified interface 916 (e.g., a lightweight compact and efficient mini-browser) that allows user to view documents (such as Hypertext Markup Language files and software associated with them), users interact with ad content directly without leaving, browsing, or accessing more of a host page. The simplified interface 916 loads content dynamically and provides partial navigation functionality that allows users to interact with the content within the confines of the in-ad space on the hosting page without browsing other content on the page that is accessible via a Web browser. From the initial browsing, the user can click on content that provides access to a plurality of remote sources locally through the embedded system of tiered application programing interfaces described herein. The in-add browsing facilitates a high user engagement without an initial redirection which allows users to browse and shop directly in the advertisement that is framed within a site.

Some in-ad browsing analyzes user behavior data, demographic data, and user preference data through the natural language processing engines 904 and/or the computer vision engines 906 that scan and analyze the input of the min-browser on the computer-mediated technology 310. Using generative models, some in-ad browsing generate content previews dynamically through transformer-based architectures that include generative pre-trained transformers and optional bidirectional encoder representations for transformers. Reinforcement learning by the generative models further improves browsing flow and dynamic visual content layout rendered by natural language processing engines 904 and/or computer vision engines 906.

At each of the site, machine learning, generative analytics, predictive analytics, etc., and on-line analytics and analysis tools score traffic to or at a destination in some systems. Some systems add code to the original and/or redirect address link so that when the link is accessed the code is sent to a local or remote analytics engine 912 that determines which destination is sending or directing traffic to a destination. Similarly, fields in the address link, custom uniform resource locators (e.g., www.progressive.com/rate-me), sessions and/or persistent cookies (e.g., files that store information about the user, access history, preferences, etc.), and/or session identifications are traced by some machine learning engines, generative analytics, and other artificial intelligence when a link is actuated, with some systems recording click events in metadata (e.g., time accessed, site address, user location, device identification, etc.). The use of artificial intelligence allows the destinations and/or destination sites to process data in real time, allowing for immediate real time adjustments to ads and ad content, identify patterns and segments used to refine targeting and/or improve embedded offers and campaigns, and/or flag suspicious activity generated by bots (e.g., automated software application that perform tasks on the network) and click fraud (e.g., artificially inflating the number of clicks an address receives).

Figure 8:
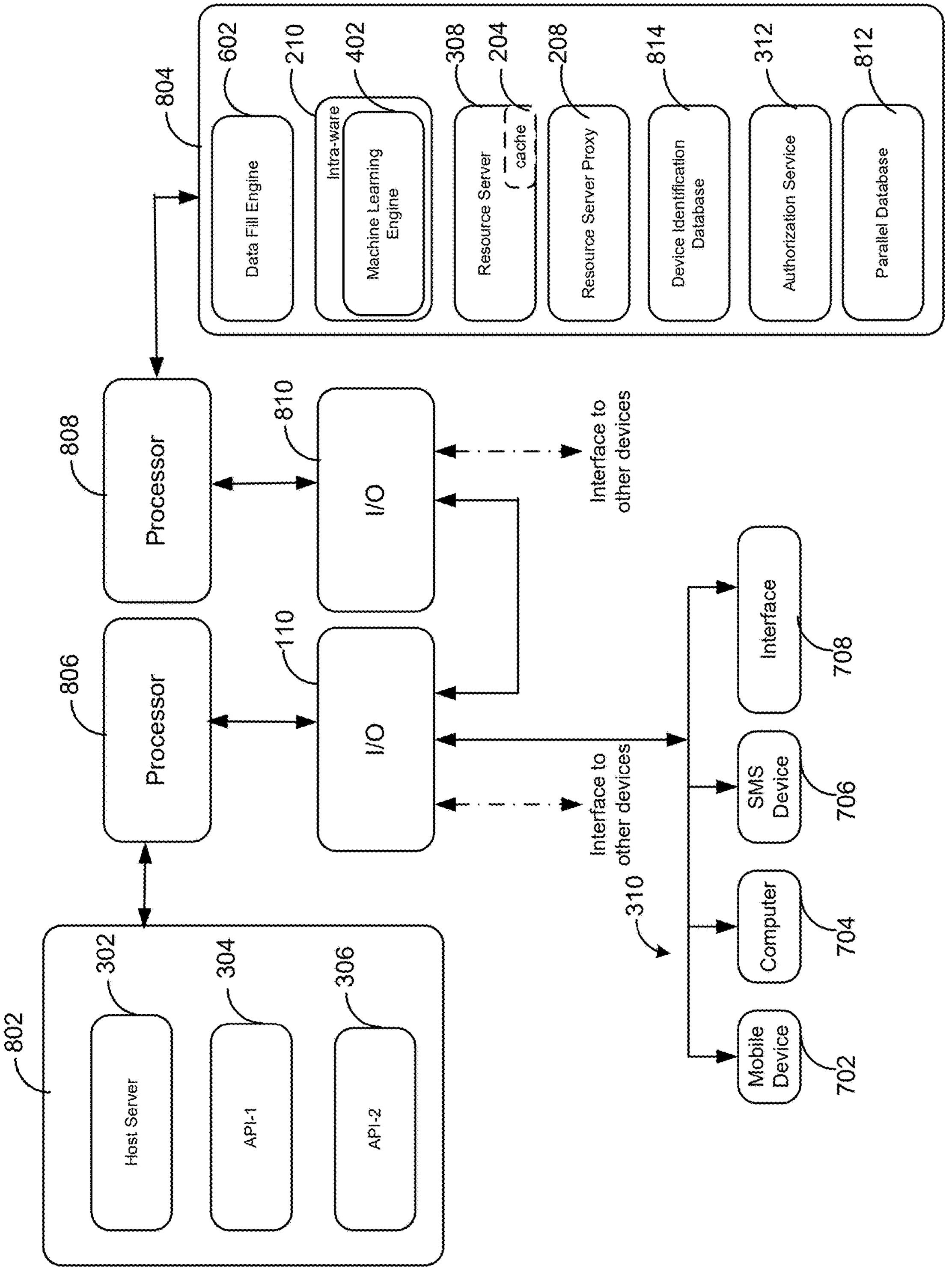
FIG. 8 is a second block diagram exemplary architecture of an embeddable system.

FIG. 8 is a second exemplary architecture of an embeddable system that executes the process flows and/or performs the functions executed by the systems described herein and shown in FIGS. 1-7. The system comprises processors 806 and 808, a non-transitory computer readable media, such as a memory 802 and 804 (the contents of which are accessible by the processors 806 and 808, respectively), and I/O interface 110 and 810. I/O interface 110 connects devices and local and/or remote applications, such as computer-mediated devices 702-706 and interface 708. The memory 802 stores instructions, which, when executed by the processor 806, causes the embeddable system to render some or all of the functionality associated with the host server 302, API-1 304, and API-2 306. The memory 804 stores instructions, which, when executed by the processor 808, causes the computer readable medium to render the functionality associated with the data fill engine 602, intraware application 210, the machine learning engine 402 (shown integrated, but can be stand-alone), the resource server 308, its cache 204, the resource server proxy 208, the device identification database 814, the authorization service (or server) 312, and the parallel database system 812. The parallel database system 812 concurrently uses two more processors or operating system processes (one is shown, 808) to service database management requests such as structured query language queries and database updates, transaction logging, I/O handling, and data buffering. The parallel database 812 is capable of performing a large number of simultaneous tasks across multiple processors and storage devices, providing quick access to databases containing many gigabytes of data.

Figure 11:
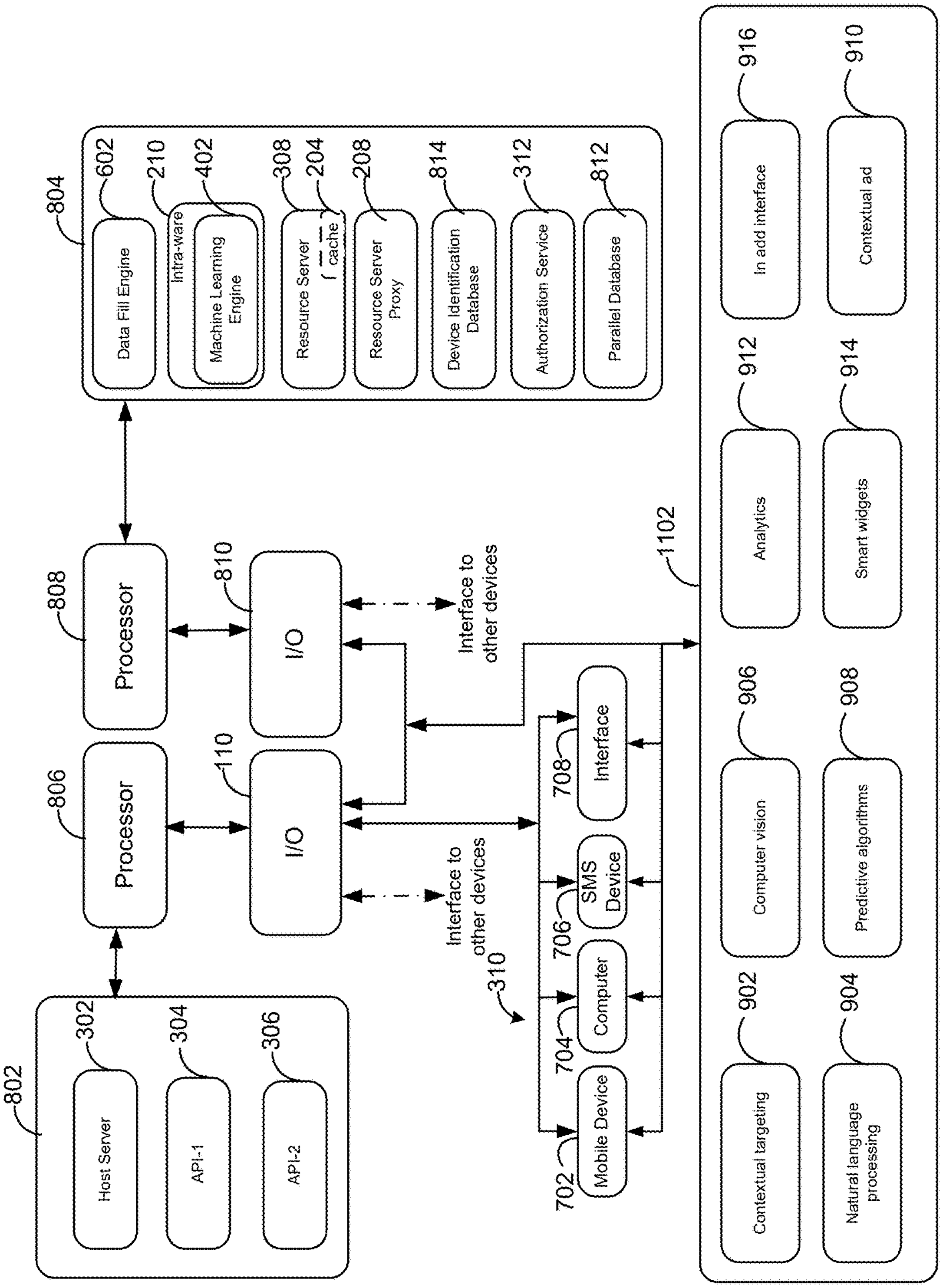
FIG. 11 is a third block diagram exemplary architecture of an embeddable system.

FIG. 11 is a third exemplary architecture of an embeddable system that executes the process flows and/or performs the functions executed by the systems described herein and shown in FIGS. 1-10. Besides the functionality described in FIG. 10, the memory 1102 stores instructions, when executed by the computer-mediated devices 702-706 and interface 708 renders the functionality associated with the contextual targeting algorithm 902, natural language processing engines 904, the computer vision engines 906, predictive algorithms 908, the analytics engines 912, the contextual add engines 910, the analytics engines 912, the smart widgets 914, and in-ad browsers 916.

The memories 802, 804 and 1102, and/or storage disclosed, may retain an ordered listing of executable instructions for implementing the functions described above in a non-transitory computer code or computer media code. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random Access Memory (RAM), a Read-Only Memory (ROM), an Erasable Programmable Read-Only Memory (EPROM or Flash memory), or a database management system. The memory 802, 804, and 1102 comprise a single device or multiple devices that may be disposed on one or more dedicated memory devices or be part of a processor or other similar device. The engines may comprise a processor or a portion of a program that executes or supports information exchange processes. When functions, steps, etc. are said to be "responsive to" or occur "in response to" another function or step, etc., the functions or steps necessarily occur as a result of another function or step, etc. It is not sufficient that a function or act merely follow or occur subsequent to another. Computer-mediated technology 310 enables human communication that occurs through two or more electronic devices. The devices may provide input from various sources, including, but not limited to, audio, text, images, video, augmented reality, etc. The term "environment" refers to the collection of resources served by a cluster serving a web site.

While each of the systems and methods shown and described herein operate automatically and operate independently, they also may be encompassed within other systems and methods, including any number of iterations of some or all of the process used to process tasks and/or execute transactions. Alternate interactive systems may include any combinations of structure and functions described or shown in one or more of the FIGS. These embeddable systems are formed from any combination of structures and functions described. The structures and functions may process additional or different input. For example, each of the systems described may process speech (e.g., spoken utterances). The systems that process speech include automatic speech recognition engines and/or platforms that serve computer-mediated technology 310 and speech applications. A speech application, which is often run independently and remote from a speech platform and speech engine, interacts with users through computer-mediated technology 310. The speech application provides input to the speech platform that passes spoken utterances to a speech engine. The speech engine converts the spoken utterance to a representation, compares the representation of the spoken utterance to a vocabulary, and matches the representation to a vocabulary of words. The speech engine returns its interpretation of the spoken utterance, process commands, intents and related sub-entities, confidence scores of the intents and in some instances confidence scores of the related sub-entities, etc., as a recognition result. The recognition result is passed back to the host server 302 to execute the functions described in each of the embodiments and shown in each of the FIGS separately, described in the written disclosure and/or in combination.

In some architectures, embeddable systems can be downloaded to enterprise systems from a website or a virtual private cloud. Once connected to an on-premise network, the systems adds script reference tags to the hosting site and stored hypertext markup language (HTML) elements and page templates. The embeddable system workspace maps user, host, and/or harvested information to predefined object properties. When information is not available, the resource server 204 and/or its proxy 206, the data fill engine 206, etc., generates or harvests the required information. In some systems, endpoint posting to the resource server 204 and/or its proxy 206 occurs with a user click. In operation, the hosting site passes information to the resource server 204 interface with data posting with an activation (e.g., a click) of a relative and/or absolute pointing device. The destination leverages the data fill, its intelligence engines, and/or default levels to return a resource, such as an offered insurance rate in an exemplary insurance context. Acceptance may be made by an activation or click, which redirects the user to a remote environment or remote site, which in some applications complete the transaction and, in some systems, transmits a confirmation to the originating system.

The functions, acts, and/or tasks illustrated in the FIGS. or otherwise described may be executed in response to one or more sets of logic or instructions stored in or on non-transitory computer readable media as well. The functions, acts, and/or tasks are independent of the particular type of instructions set, storage media, processor or processing strategy and may be performed by software, hardware, integrated circuits, firmware, micro code and the like, operating alone or in combination.

Alternate systems are not limited to the particular hardware, processes, and/or algorithms described herein. Other suitable hardware, processes, and algorithms can be used. The systems can serve other systems across local and distributed networks. The systems illustratively disclosed herein may be suitably practiced in the absence of any element or module (e.g., hardware and/or software), and in the absence of some or all of the described functions association with a process step or component or structure of a system that are expressly described. The systems may operate in the absence of one or more of those process steps, elements and/or any subset of the expressed functions. Further, the various elements described in each of the many embeddable systems described herein are regarded as divisible with regard to the individual elements described, rather than inseparable as a whole. In other words, alternate systems encompass any variation and combinations of elements, components, and process steps described herein and may be made, used, or executed without the various elements described (e.g., they operate in the absence of any element, including those elements, systems and/or processes or certain process steps or elements disclosed in the prior art including those not expressly disclosed herein).

The embeddable system converts proprietary protocol from an originating source to a destination node to process remote resources. The systems are stand-alone, independent, or a unitary part of an enterprise system programmed to execute specific tasks repeatedly. The systems render a seamless user experience that avoids the questions and form fatigue most sites experience. The system's flexible integration minimizes enterprise effort and abstracts away complexity for adopting systems while improving yields. The tiered application programming interfaces shield the host server 302 from software and other remote device dependencies or the complexities of executing the underlying software that provide the resources and services, and/or executes the tasks and/or transactions. In some applications, the tiered application programming interfaces focus on coordination and distribution by a secure architecture.

The subject-matter of the disclosure may also relate, among others, to the following aspect or aspects (referenced by numbers):

1. A system that provides local access to remote services and remote data comprising:
   a parallel circuit that transfers data between a plurality of components;
   a volatile memory;
   a processor that reads to and writes to the volatile memory sequentially;
   a computer readable medium storing a program in a non-transitory media that provides access to a plurality of remote resources locally by:
   requesting content from an original address a user requests;
   receiving a first requested content and a first redirect uniform resource locator in response to the requesting content from the original address that reroutes a navigation from the original address the user requested to a redirect destination address that serves an access token;
   unlocking access to an application programming interface in response to validating the access token served by the redirect destination address; and
   receiving a second requested content and a second redirect uniform resource locator in response to transmitting the access token to the original address;
   the second redirect uniform resource locator transfers a user to an environment rendered at an address different from the original address and different from the redirect destination address.
2. The system of aspect 1 where the first redirect uniform resource locator includes a first field that comprises the original address of a first server and a second field that comprises a destination address in a destination field.
3. The system of aspect 2 where the first redirect uniform resource locator includes a third field that established a permanence of the redirection of the first redirect uniform resource locator and a cache header.
4. The system of aspect 2 where the second redirect uniform resource locator includes a third field that established a permanence of the redirection of the second redirect uniform resource locator and a cache header.
5. The system of any of aspects 1, 2, 3 and/or 4 where the access token comprises data that includes a client identifier, a grant type designation based on a user's credentials and a stateful identifier.
6. The system of any of aspects 1, 2, 3, 4 and/or 5 where the second requested content is generated by a machine learning engine.
7. The system of aspect 6 where the machine learning engine comprises a plurality of machine learning engines operating in a parallel configuration.
8. The system of aspect 6 where the machine learning engine comprises a plurality of machine learning engines operating in a serial configuration where an output of a first machine learning engine is transmitted to an input of a second machine learning engine.

9. The system of and of aspect 7 and/or 8 where a machine learning engine residual of the plurality of machine learning engines is less than the machine learning residual of the first machine learning engine.

10. The system of any of aspects 1, 2, 3, 4, 5, 6, 7, 8 and/or 9 where the computer readable medium storing the program in the non-transitory media that provides access to the plurality of remote resources locally further includes program code that renders the first requested content based on local data collected by:
identifying and downloading linked content from a plurality of remote sources through a communication network;
converting the downloaded content into local content elements by intercepting links between the content elements and mapping the intercepted links to redirected links that locate the same download content in a local cache or a local server proxy; and
providing access to the local cache or the local server proxy in response to the user's request.

11. The system of any of aspects 1, 2, 3, 4, 5, 6, 7, 8, 9 and/or 10 where the access token includes a tracking code that is used to identify a user's plurality of user devices and is used to identify a user's active device from the user's plurality of devices that is to receive the second requested content and the second redirect uniform resource locator.

12. The system of any of aspects 1, 2, 3, 4, 5, 6, 7, 8, 9, 10, and/or 11 where the first requested content comprises a statutory disclosure and the second requested content comprises an insurance quote.

13. The system of any of aspects 1, 2, 3, 4, 5, 6, 7, 8, 9, 10, 11 and/or 12 where the first requested content is generated from data sourced from a data fill engine and a loss underwriting exchange system.

14. The system of any of aspects 1, 2, 3, 4, 5, 6, 7, 8, 9, 10, 11, 12 and/or 13 where the second requested content includes an encrypted tacking code that identifies a form factor of a user device requesting content from the original address.

15. The system of any of aspects 1, 2, 3, 4, 5, 6, 7, 8, 9, 10, 11, 12, 13, 14 and/or 15 where a tracking code authenticates multiple user device with the same communication session.

16. A computer readable medium storing a program in a non-transitory media that provides access to a plurality of remote resources locally by:
requesting content from an original address a user requests;
receiving a first requested content and a first redirect uniform resource locator in response to the requesting content from the original address that reroutes a navigation from the original address the user requested to a redirect destination address that serves an access token;
unlocking access to an application programming interface in response to validating the access token served by the redirect destination address; and
receiving a second requested content and second redirect uniform resource locator in response to transmitting the access token to the original address;
the second redirect uniform resource locator transfers a user to an environment rendered at an address different from the original address and different from the redirect destination address.

17. The computer readable medium of aspect 16 where the first redirect uniform resource locator includes a first field that comprises the original address of a first server and a second field that comprises a destination field.

18. The computer readable medium of aspect 17 where the first redirect uniform resource locator includes a third field that established a permanence of the redirection of the first redirect uniform resource locator.

19. The computer readable medium of aspect 17 where the second redirect uniform resource locator includes a third field that established a permanence of the redirection of the second redirect uniform resource locator.

20. The computer readable medium of any of aspects 16, 17, 18, and/or 19 where the access token comprises data that includes a client identifier, a grant type designation based on a user's credentials, and a statefulness identifier.

21. The computer readable medium of any of aspects 16, 17, 18, 19 and/or 20 where the second requested content is generated by a machine learning engine.

22. The computer readable medium of aspect 21 where the machine learning engine comprises a plurality of machine learning engines operating in a parallel configuration.

23. The computer readable medium of aspect 21 where the machine learning engine comprises a plurality of machine learning engines in a serial configuration where an output of a first machine learning engine is transmitted to an input of a second machine learning engine.

24. The computer readable medium of any of aspects 22 and/or 23 where a machine learning engine residual of the plurality of machine learning engines is less than the machine learning residual of the first machine learning engine.

25. The computer readable medium of any of aspects 16, 17, 18, 19, 20, 21, 22, 23 and/or 24 where the computer readable medium storing the program in the non-transitory media that provides access to the plurality of remote resources locally further includes program code that renders the first requested content based on local data collected by:
identifying and downloading linked content from a plurality of remote sources through a communication network;
converting the downloaded content into local content elements by intercepting links between the content elements and mapping the intercepted links to redirected links that locate the same download content in a local cache or a local server proxy; and
providing access to the local cache or the local server proxy in response to the user's request.

26. The computer readable medium of any of aspects 16, 17, 18, 19, 20, 21, 22, 23, 24 and/or 25 where the first requested content comprises a statutory disclosure and the second requested content comprises an insurance quote.

27. The computer readable medium of any of aspects 16, 17, 18, 19, 20, 21, 22, 23, 24, 25 and/or 26 where the first requested content is generated from data sourced from a data fill engine and a loss underwriting exchange computer readable medium.

28. The computer readable medium of any of aspects 16, 17, 18, 19, 20, 21, 22, 23, 24, 25, 26 and/or 27 where the second requested content includes an encrypted tacking code that identifies a form factor of a user device requesting content from the original address.

29. The computer readable medium of any of aspects 16, 17, 18, 19, 20, 21, 22, 23, 24, 25, 26, 27 and/or 28 where a tracking code authenticates multiple user device with the same communication session.

30. The computer readable medium of any of aspects 16, 17, 18, 19, 20, 21, 22, 23, 24, 25, 26, 27, 28 and/or 29 where the computer readable medium storing a program resides on an embeddable system.

Other systems, methods, features, and advantages will be, or will become, apparent to one with skill in the art upon examination of the figures and detailed description. It is intended that all such additional systems, methods, features, and advantages be included within this description, be within the scope of the disclosure, and be protected by the following claims.

What is claimed is:

1. A system that provides local access to remote services and remote data comprising:

a parallel circuit that transfers data between a plurality of components;

a memory;

a processor that reads to and writes to the memory and a computer readable medium storing a program in a non-transitory media that provides access to a plurality of remote resources locally through an interactive widget by:

requesting content from an original address;

receiving a first requested content and a first redirect uniform resource locator in response to the requesting content from the original address that reroutes a navigation from the original address to a redirect destination address that serves an access token;

unlocking access to an application programming interface in response to validating the access token served by the redirect destination address; and receiving a second requested content and a second redirect uniform resource locator in response to transmitting the access token to the original address;

the second requested content comprises one or more customized financial services; and the second redirect uniform resource locator transfers a user to an environment rendered at an address different from the original address and different from the redirect destination address through the widget.

2. The system of claim 1 where the first redirect uniform resource locator includes a field related to the original address of a resource and a second field that comprises a destination address in a destination field.

3. The system of claim 2 where the first redirect uniform resource locator includes a third field that comprises a cache header.

4. The system of claim 1 where the one or more customized financial services is processed by a generative model.

5. The system of claim 1 where the access token comprises data that includes a client identifier and a stateful identifier.

6. The system of claim 1 where the second requested content is generated by a one or more learning models.

7. The system of claim 6 where the one or more learning models comprises a plurality of learning models operating in a parallel configuration.

8. The system of claim 6 where the one or more learning models comprises a plurality of learning models operating in a serial configuration where an output of a learning model is transmitted to an input of a second learning model.

9. The system of claim 1 where the financial services comprises data relating insuring a plurality of drivers and a plurality of vehicles.

10. The system of claim 1 where the computer readable medium storing the program in a non-transitory media that provides access to a plurality of remote resources locally through an interactive widget by:

executing an on-line analytics that tracks traffic received on a destination.

11. The system of claim 1 where the access token includes a code that identifies a user device.

12. The system of claim 1 where the first requested content comprises a statutory disclosure and the second requested content comprises a customized insurance quote or an insurance rate.

13. The system of claim 1 where the first requested content is generated from a contextual ad.

14. The system of claim 1 where the second requested content comprises a proof of insurance document transmitted to a different user.

15. The system of claim 1 where the access token includes a code that authenticates multiple user devices.

16. A computer readable medium storing a program in a non-transitory media that provides access to a plurality of remote resources locally by:

requesting content from an original address from a dynamically generated content;

receiving a first requested content and a first redirect uniform resource locator in response to the requesting content from the original address that routes a navigation from the original address requested to a redirect destination address that serves a token;

unlocking access to an application programming interface in response to validating the token served by the redirect destination address; and receiving a second requested content related to a financial service and a second redirect uniform resource locator in response to transmitting the token to the original address;

the second redirect uniform resource locator transfers a request to an address different from the original address and different from the redirect destination address.

17. The computer readable medium of claim 16 where the dynamically generated content is rendered by a contextual ad.

18. The computer readable medium of claim 16 where the dynamically generated content is rendered in-line within a host page from a remote source.

19. The computer readable medium of claim 16 further comprising rendering an in page interface that enables a user to view.

20. A system that provides local access to remote services and remote data locally via an integrated system comprising:

a computer readable medium storing a program in a non-transitory media that provides access to a plurality of resources locally by:

requesting content from an original address from a request;

receiving a first requested content and a first uniform resource locator in response to the requesting content from the original address that reroutes a navigation from the original address requested to a redirect destination that serves a token;

unlocking access to an application programming interface in response to validating the token served by the destination; and receiving a second requested content and a second redirect uniform resource locator in response to transmitting the token to the original address;

the second requested content is generated in response to a contextual ad, an interactive widget, or an in-ad browser, the in-ad browser being separate from a Web browser;

the second redirect uniform resource locator transfers a request to an address different from the original address and different from the redirect destination address.

21. The system of claim 20 where system where the address different from the original address provides a proof of an insurance document to a third party.

* * * * *